July 15, 1969      E. A. MEYER      3,455,528
BRAKE LINE CLIP
Filed Aug. 22, 1967      2 Sheets-Sheet 1
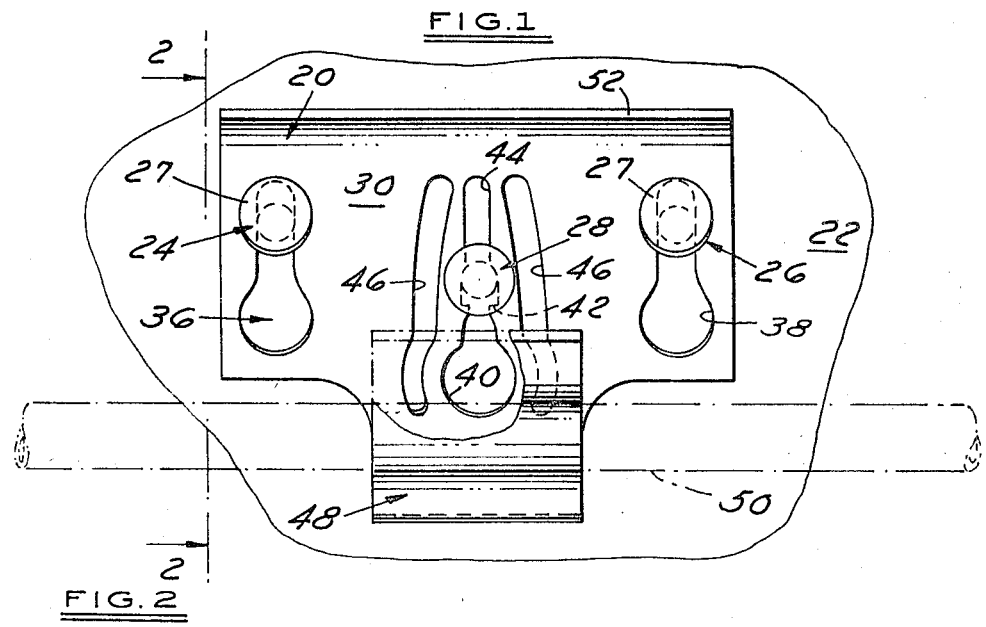
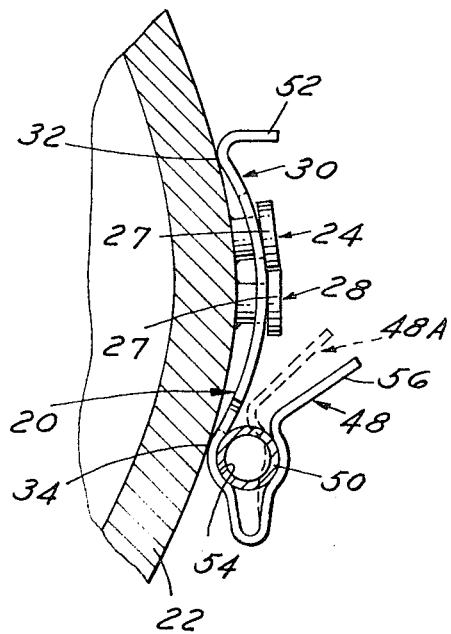
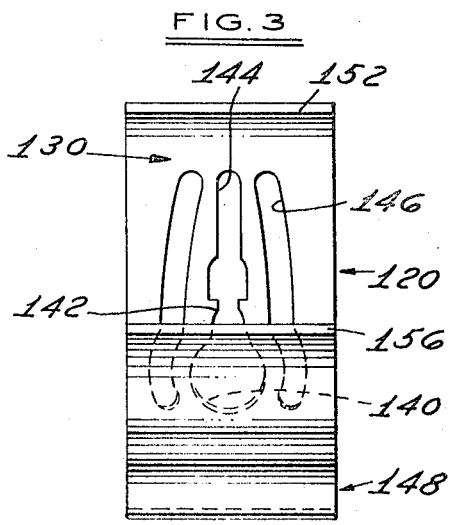
INVENTOR
ENGELBERT A. MEYER
BY
Burton & Parker
ATTORNEYS

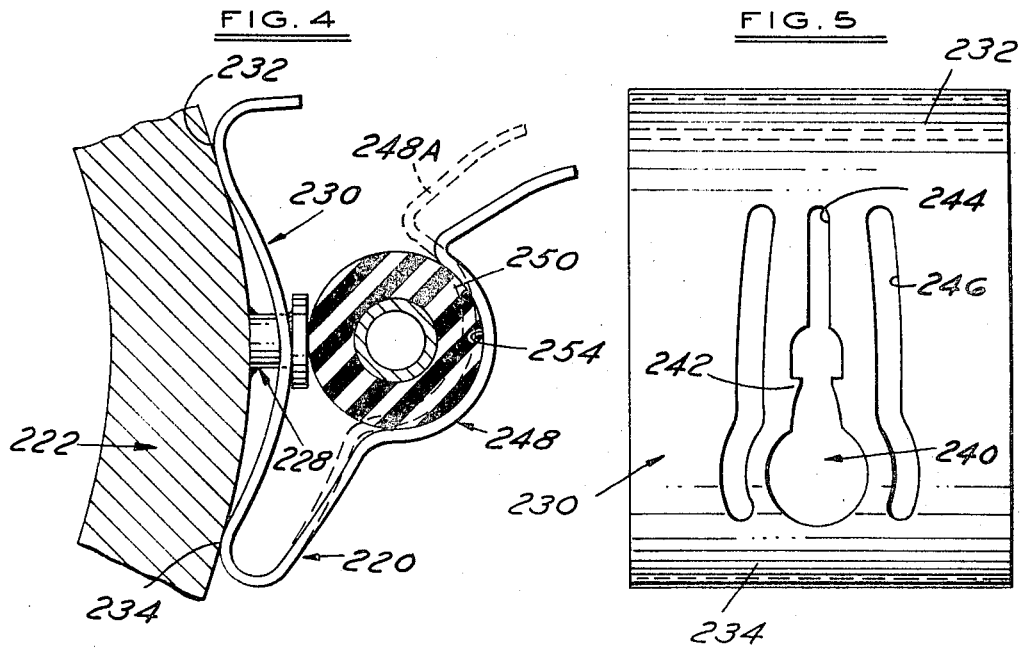
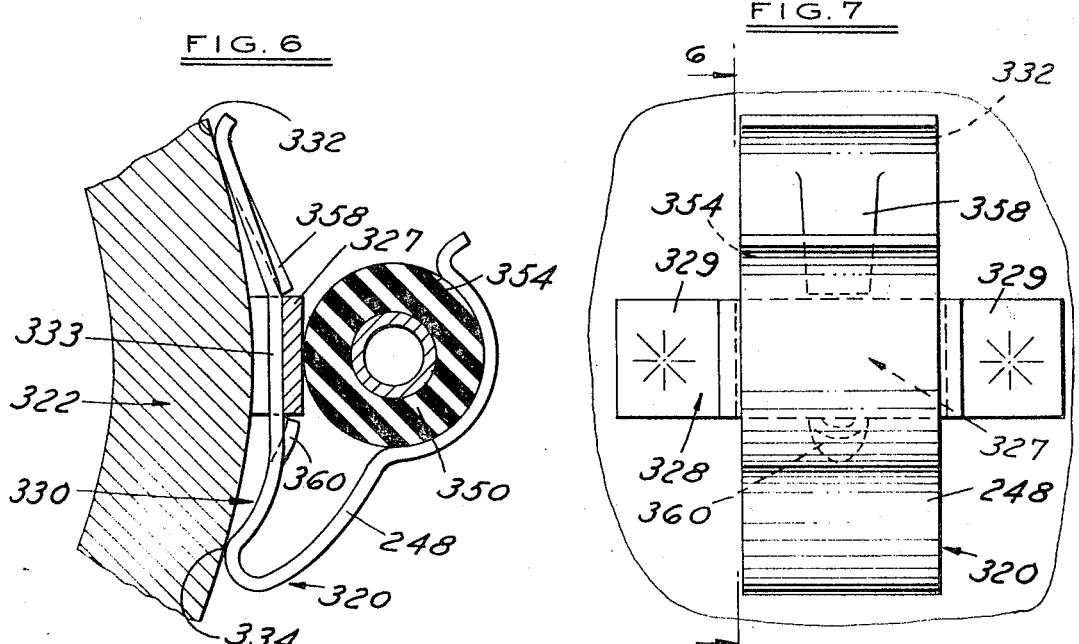
INVENTOR
ENGELBERT A. MEYER
BY
Burton & Parker
ATTORNEYS

United States Patent Office 3,455,528
Patented July 15, 1969

3,455,528
BRAKE LINE CLIP
Engelbert A. Meyer, Union Lake, Mich., assignor to Warren Fastener Corporation, Mount Clemens, Mich., a corporation of Michigan
Filed Aug. 22, 1967, Ser. No. 662,427
Int. Cl. F16l 3/02
U.S. Cl. 248—73                    6 Claims

ABSTRACT OF THE DISCLOSURE

In general, this disclosure relates to a retainer and assembly for attaching a member such as a cable or conduit line to a support. The assembly includes a retainer attached to the support and a resilient clip tensioned beneath the retainer, against the support, having a hooked end for receiving the member.

Various clips and retainer assemblies have been suggested by the prior art, however the commercial methods of securing cables, wires, and the like to a support has changed little. A wiring harness, for example, generally includes a strap or hook which is bolted to the support. Where bolts cannot be utilized, as where a brake-line is to be secured to the rear axle of an automobile, a J-shaped clip is welded to the axle at the head portion, and the clip is merely peened with a hammer or the like over the brake line. The clip is not resilient, and may restrict the brake line during securement. However, later adjustment or impact often causes fracture of the weld. It is an object of the retainer asembly of this invention to provide a resilient clip which will not restrict a line or conduit, and which can be removed if necessary. It is another object of this invention to provide a retainer assembly which can be secured to the support without perforation, such as by welding, which is ont as subject to fracture as the retainer clips presently used.

Briefly, the retainer assembly of this invention includes a retainer secured to the support having a retainer portion which overlies the support in spaced relation, and a resilient clip tensioned beneath the retainer portion, against the support, which receives the member to be retained.

The retainer may be a headed button, or a series of buttons secured to the support without perforation as shown in the United States Letters Patent 3,153,468 to Sweeney. In the method of securing buttons shown by the Sweeney patent, the button is welded to steel or adhesively secured to various materials including steel, thereby eliminating the corrosion problems inherent in previously used techniques requiring a hole through the support. A suitable size button, presently used in the securement of automotive trim or the like involves a button which is 0.200 inch in diameter at its head end, and 0.160 inch in height; the shank of the button being slightly greater than one-half the diameter of the head. Utilization of this new concept in the attachment of automotive trim has provided substantial economies and advantages over previous methods. Similar advantages can be obtained in other fields such as home appliances or the like. According to another embodiment of the retainer assembly of this invention, the retainer is a strap which is secured to he support, as by welding, adjacent either end of the strap, and the strap has a mid-portion spaced from the support. The strap retainer has the advantage that it is less subject to fracture under impact that the buttons because it is secured to this support at two locations rather than one, however the strap is more expensive to produce and time-consuming to assemble than the button disclosed in the Sweeney patent.

The resilient clip has a leg portion which is received beneath the retainer portion of the retainer and tensioned thereagainst adjacent its mid-portion. The leg portion of the clip is cup-shaped in cross section and the opposed ends are thereby tensioned against the support. One end of the leg portion of the clip is reversely folded to define a clip portion which receives the member to be secured, such as a line or conduit.

The retainer assembly of this invention may be adapted to secure a line or the like to a curved surface, such as the exterior of an automobile rear axle. In this embodiment, the leg portion of the clip is arcuate, but of a diameter less than the daimeter of the support to provide the tensioned engagement.

The clip portion may be adapted to cooperate with the retainer to increase the tension in the leg portion, by reversely folding the clip portion over the leg portion. In this embodiment, the member is secured near the mid-portion of the leg of the clip, tensioning the clip away from the leg portion; thereby tensioning the leg portion against the support and beneath the retainer. This will be described more fully in the description of the drawings which follows. This embodiment also has the advantage that the clip may be secured to the retainer in either position relative to the axis of the member, such as a brake line or the like, because the clip is centered on the retainer. According to another embodiment of this invention, the clip is secured to three headed buttons to insure that the clip can only be secured such that the clip portion lies in the axis of the member to be secured.

Other objects, advantages and meritorious features of this invention will more fully appear from the following specification, claims, and accompany drawings, wherein:

FIG. 1 is a top view, partially cross sectioned, of one embodiment of the retainer assembly of this invention;

FIG. 2 is a side cross-sectional view of FIG. 1 in the direction of view arrows 2—2;

FIG. 3 is a top view of another embodiment of a clip utilized in the retainer assembly of this invention;

FIG. 4 is a side cross-sectional view of another embodiment of the retainer assembly of this invention;

FIG. 5 is a bottom view of the clip utilized in the assembly of FIG. 4;

FIG. 6 is a side cross-sectional view of another embodiment of the retainer assembly of this invention in the direction of view arrows 6—6 of FIG. 7; and FIG. 7 is a bottom view of the retainer assembly shown in FIG. 6.

In the embodiment of the retainer assembly shown in FIGURES 1 and 2, the clip 20 is secured to the support 22 by three buttons 24, 26 and 28, each having a head or retainer portion 27 spaced from the plane of the support. The buttons may be secured to the support without perforation in accordance with the method disclosed in the above referenced Sweeney patent, or other suitable means. The support, in this embodiment may be an arcuate surface as shown, such as would be the case in an automotive rear axle housing, or the concave exterior surface of any panel or support structure.

The clip 20 has an arcuate leg portion 30 which is tensioned beneath the button heads against the support. The arcuate portion of the resilient clip has a diameter less than the diameter of the support, such that the clip is tensioned beneath the buttons adjacent its midportion, and the opposed surfaces 32 and 34 are tensioned against the support, referred to hereinafter as the ends of the arcuate portion.

The arcuate portion flexure is desirable to compensate for variations in relative alignment of the buttons, and variations in the angular alignment between the buttons. It is noted that buttons 24 and 26 lie in one plane as defined through the axis of the support, and button 28 is defined in the second plane. This configuration insures that the clip can only be secured as shown, such that the clip portion 48 lies in the axis of the member 50 to be secured. The opposite end 52 of the clip may be turned away from the support, as shown, to prevent marring or scratching of the support by a sharp edge on the clip.

The body portion of the clip includes a central key hole slot having an enlarged opening 40, which receives the head portion 27 of the button 28 therethrough, and an elongated slot 44 which receives the shank of the button. In addition, two slots 46, on opposed sides of the central key hole slot, permit flexure of the body portion to receive the button in the elongated slot portion 44. A reduced diameter portion 42 in the slot prevents withdrawal of the button from the slot. The key hole slots 36 and 38 receive the buttons 24 and 26 respectively.

In this embodiment, the clip portion 48 is a continuation of one end 34 of the arcuate portion of the clip, and is reversely folded over the arcuate portion to define a channel 54 which receives the conduit member or line 50. In the relaxed position of the clip portion, indicated in phantom at 48A, the diameter of the channel 54 is less than tht diameter of the member 50. Thus, the clip portion must be flexed or tensioned away from the arcuate portion 30 to permit receipt of the member, and is locked in place when the tension is released. The end of the clip portion 56 extends away from a support at an angle to permit finger manipulation of the clip portion.

The embodiment of the clip 120 shown in FIGURE 3 is similar to the clip shown in FIGURES 1 and 2, except that the clip is adapted to be secured to a support by only one button, and therefore does not have the one-way alignment feature described in relation to FIGURES 1 and 2. The common elements have been numbered in the same sequence as in FIGURES 1 and 2.

The embodiment of the retainer assembly shown in FIGURES 4 and 5 includes a button 228, which may be secured to the support 222 in accordance with the manner described hereinabove, and a resilient clip 220. The button is received in a key-hole slot 240, similar to the key-hole slot 40 of FIGURES 1 and 2, and has been numbered accordingly. The leg or arcuate portion 230 of the clip is tensioned substantially at its midportion beneath the button head, which tensions the ends 232 and 234 against the support.

In the embodiment shown in FIGURES 4 and 5, the clip portion 284 extends to define a member receiving channel 254 over the retainer 228, such that the line 250, or other member, is tensioned against the retainer. The retainer portion must be tensioned away from the leg portion 230 to receive the member 250, as described hereinabove, however in this embodiment flexure of the clip portion tensions the leg portion against the support and beneath the button head. Thus, as the clip portion is tensioned from the relaxed position, shown in phantom at 248A, the end of the leg portion 234 is urged against the support. The end 234 acts as a fulcrum to tension the midportion beneath the button head, and because the button is fixed, the end 232 is not affected. Because the clip is resilient, and because the diameter of the member 250 is greater than the distance between the channel 254 and the retainer, the tension created in the leg portion will remain after the member is inserted. A cooperation is thus established between the clip portion and the leg portion to improve the securement of the member to the support. It should also be noted that the embodiment shown in FIGURES 4 and 5 eliminates the need for a one-way securement, as provided by the embodiment of the retainer assembly shown in FIGURES 1 and 2. The fact that the number 250 is retained substantially in the axis of the retainer 228 permits securement of the clip in either direction relative to the axis of the member 250, and obviates the necessity of three buttons as shown in FIGURE 1.

The embodiment of the retainer assembly shown in FIGURES 6 and 7 is functionally similar to the embodiment shown in FIGURES 4 and 5, however this embodiment utilizes a strap 328 rather than a button. The strap is secured to the support adjacent either end 329, by any suitable means, and has a retainer portion 327 therebetween, spaced from the plane of the support. The leg portion 330 of the clip 320 is received between the strap and the support, and is tensionied adjacet its midportion beneath the retainer portion 327. Locking tangs 358 and 360 have been struck from the leg portion to lock the clip in position. The arcuate leg portion 330, in this embodiment, is provided with a flat portion 333 to conform to the strap.

As described in relation to the embodiment of FIGURES 4 and 5, the ends of the leg portion 332 and 334 are tensioned against the support when the clip is secured to the retainer, and the tension is increased when the member 350 is urged into the clip portion channel 354. The clip may be removed from the strap simply by depressing the tang 358 and sliding the clip leg portion from beneath the strap. The retainer of this assembly has the advantage that it is less subject to accidental removal or impact or vibration, in that the strap is secured to the support at two locations 328. The button retainers, however, have the advantage that they are less expensive to produce and may be secured to the support by mass production techniques as described in the above referenced Sweeney patent.

Various materials may be used for all parts of the retainer assembly, however the automotive industry utilizes metal primarily for the automotive support, such as a rear axle housing, the button or strap, and the clip. Steel is used primarily for the support, with stainless steel being used for the button, as well as cold rolled zinc plated steel. The clip may be fabricated from sheet metal stock in a continuous die operation. The buttons may then be stud welded to the support in accordance with the method described in the above referenced Sweeney application. The strap 328, shown in FIGURES 6 and 7, may be welded to the support in a similar operation.

While the retainer assembly, clip and button have been described with reference to certain embodiments and arrangement of elements, it is understood by those skilled in the art that various modifications may be made to the embodiments disclosed herein without departing from the purview of the appended claims or the invention as disclosed herein. For example, various features of the embodiments disclosed may be interchanged, such as utilization of a strap with the clip shown in FIGURE 3, or providing a retainer portion which extends over the center button of FIGURE 1 to provide the advantages of the retainer portion of FIGURES 4 to 7. It will also be understood by those skilled in the art, that the retainer assembly of FIGURES 4 to 7, for example, may be utilized on a flat support.

What is claimed is:

1. A retainer assembly for securing a member to a support, comprising: a retainer secured to the support having a retainer portion spaced from the support, and a resilient clip having a leg portion received beneath said retainer portion and a clip portion reversely folded over said leg portion and said retainer portion, said leg portion tensioned beneath said retainer portion against the support, and said clip portion defining a member receiving channel overlying said retainer portion and adapted to tension a member received therebeneath against said retainer portion.

2. The retainer assembly defined in claim 1, characterized in that the axis of said clip portion channel is substantially coincident with the axis of said retainer including said retainer portion.

3. The retainer assembly defined in claim 1, characterized in that said retainer is a button having a retainer head portion spaced from said support, and said leg portion has a key hole slot receiving said button.

4. The retainer assembly defined in claim 1, characterized in that said retainer is a strap secured to said support adjacent either end having a midportion spaced from said support, and said leg portion is received beneath said midportion and tensioned therebeneath against said support.

5. The retainer assembly defined in claim 4, characterized in that said leg portion is generally arcuate, and includes a flat portion adjacent its midportion which is received beneath the midportion of the strap, and said leg portion includes opposed upwardly disposed tangs, struck from said leg portion, which prevent shifting of the leg portion beneath the midportion of the strap.

6. The retainer assembly defined in claim 1, characterized in that said leg portion is generally arcuate, and tensioned at either end against said support, beneath said retainer portion, and said clip portion is reversely folded adjacent one of the tensioned ends of said leg portion at an acute angle to overlie said leg portion.

References Cited

UNITED STATES PATENTS

| | | | |
|---|---|---|---|
| 1,896,630 | 2/1933 | Knutson | 248—73 X |
| 1,995,370 | 3/1935 | Walters | 248—73 X |
| 2,277,738 | 3/1942 | Wilkinson | 248—224 X |
| 2,560,486 | 7/1951 | Shears | 248—73 X |
| 2,878,964 | 3/1959 | Anderson | 248—221 |

FOREIGN PATENTS 500,244 3/1954 Canada.

CHANCELLOR E. HARRIS, Primary Examiner

U.S. Cl. X.R.

24—73; 248—224